March 15, 1932. E. LOBO, SR., ET AL 1,850,019
DEVICE FOR UTILIZING THE MOTIVE POWER OF AUTOMOTIVE VEHICLES
Filed Nov. 29, 1930 4 Sheets-Sheet 1

INVENTORS
Ernesto Lobo, Sr. and
Ernesto Lobo, Jr.
BY
ATTORNEYS.

INVENTORS.
Ernesto Lobo, Sr. &
BY Ernesto Lobo, Jr.
ATTORNEYS.

March 15, 1932.  E. LOBO, SR., ET AL  1,850,019
DEVICE FOR UTILIZING THE MOTIVE POWER OF AUTOMOTIVE VEHICLES
Filed Nov. 29, 1930  4 Sheets-Sheet 3
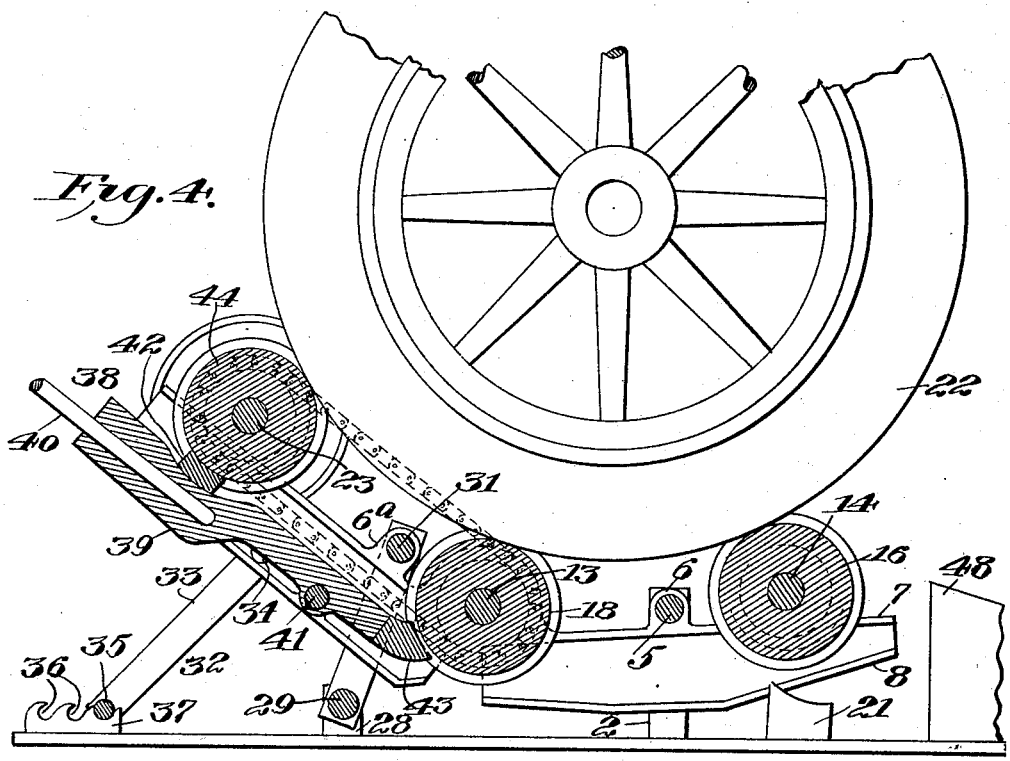
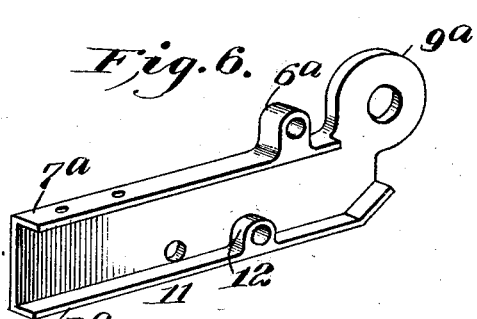
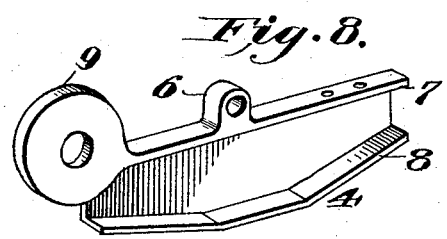
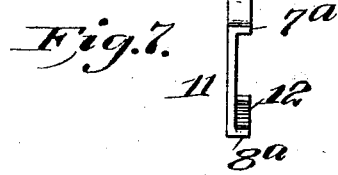
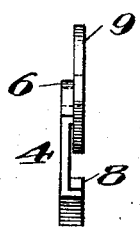
INVENTORS.
Ernesto Lobo, Sr.
BY Ernesto Lobo, Jr.
ATTORNEYS.

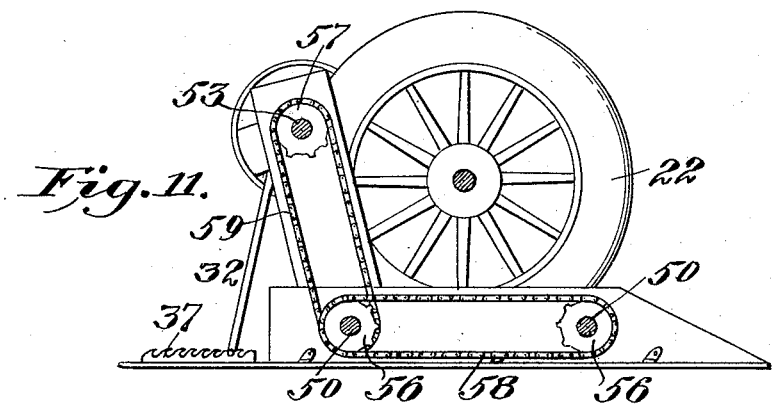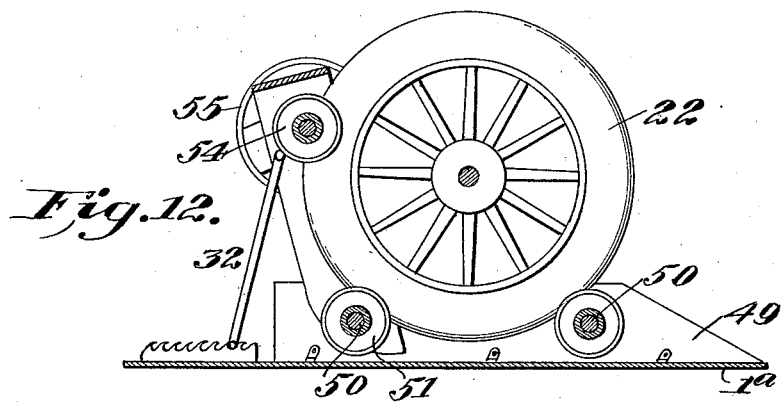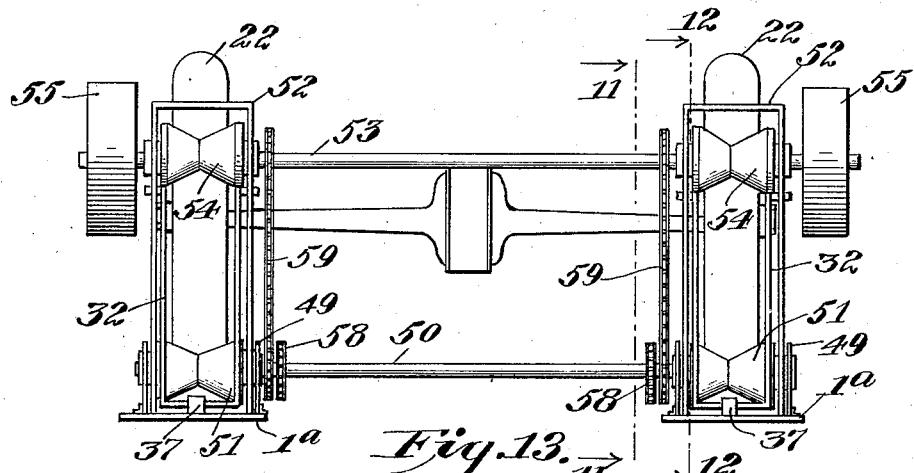

Patented Mar. 15, 1932

1,850,019

UNITED STATES PATENT OFFICE

ERNESTO LOBO, SR., AND ERNESTO LOBO, JR., OF MEXICO CITY, MEXICO

DEVICE FOR UTILIZING THE MOTIVE POWER OF AUTOMOTIVE VEHICLES

Application filed November 29, 1930, Serial No. 499,112, and in Mexico December 6, 1929.

This invention relates to a device for utilizing the motive power of automotive vehicles.

An object of the invention is the construction of a simple and efficient apparatus to be operated by the wheel or wheels of a motor vehicle, whereby power can be secured for operating any suitable machinery.

Another object of the invention is the construction of an apparatus whereby the wheel or wheels of a motor vehicle can be easily placed thereon, so that when the wheel is rotated, movement will be imparted to the apparatus to transmit power to a unit or auxiliary device to be operated.

With the foregoing and other objects in view, our invention comprises certain novel constructions, combinations and arrangements of parts as will be hereinafter fully described, illustrated in the accompanying drawings, and more particularly pointed out in the appended claims.

In the drawings:

Figure 3 is a view in side elevation of the apparatus, with a vehicle wheel thereon and showing the position of the apparatus as it "clamps" or presses tightly against the wheel, while Figure 4 is a vertical, longitudinal sectional view of the same.

Figure 6 is a perspective view of one of the side plates of the auxiliary section, while Figure 7 is an end view of the same.

Figure 8 is a perspective view of one of the side plates of the primary section, while Figure 9 is an end view of the same.

Figure 11 is a sectional view taken on line 11—11, Figure 13 and looking in the direction of the arrows.

Figure 12 is a sectional view taken on line 12—12, Figure 13, and looking in the direction of the arrows.

Figure 13 is a view in elevation of the rear end of the embodiment shown in Figures 11 and 12.

Figure 1:
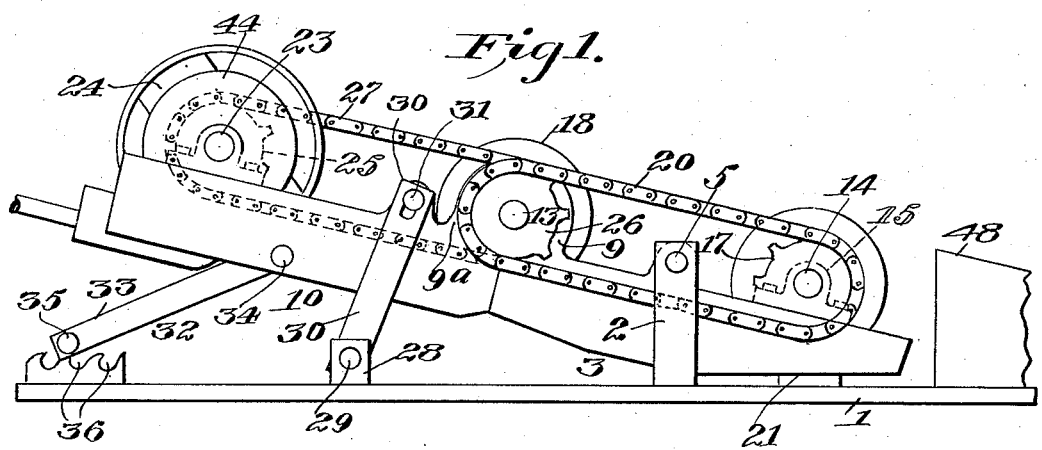
Figure 1 is a view in side elevation of an embodiment of the present invention.

Referring to the drawings by numerals, 1 designates the base or platform, to which is suitably secured stationary uprights 2. The primary section 3 comprises two side plates 4 (see Fig. 8) which are mounted on said uprights by having a rod 5 extending through apertured lugs 6 and the upper ends of uprights 2. Each side plate 4 (Fig. 8) is provided with an upper inwardly extending flange 7 and a lower inwardly extending flange 8. Extending from the inner end of each plate 4 and integral with the flange 7 is an apertured ear 9.

Figure 2:
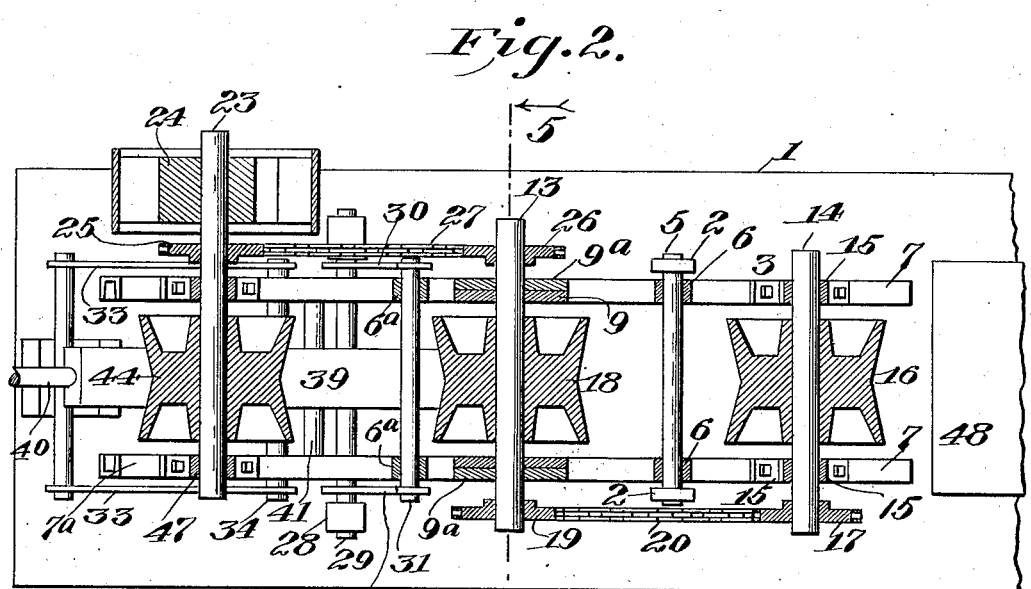
Figure 2 is a horizontal sectional view taken through the apparatus.
Figure 3:
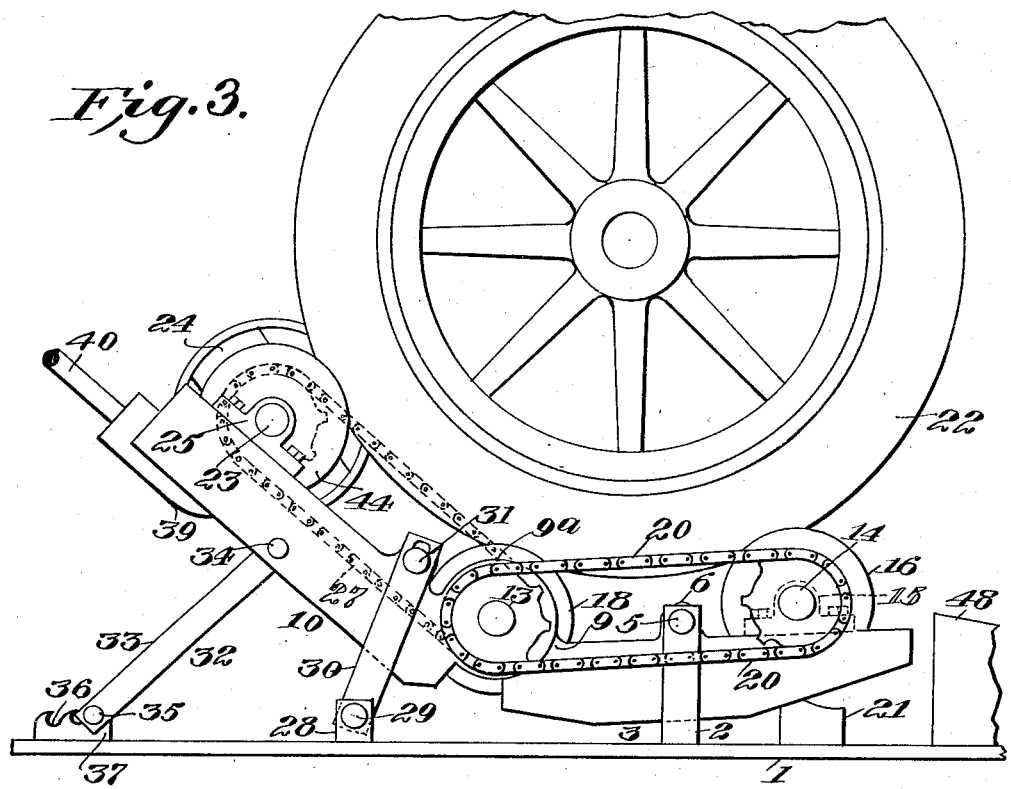
Figure 5:
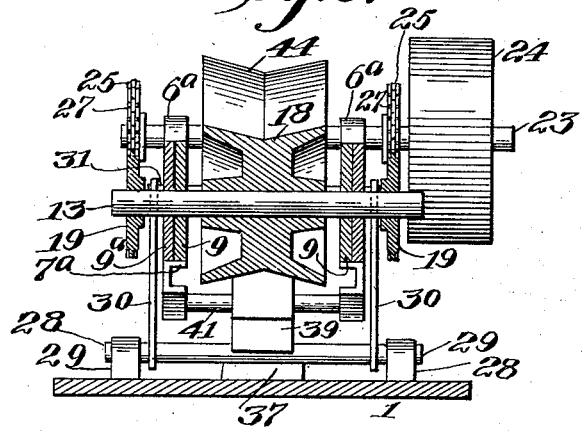
Figure 5 is a transverse sectional view taken on line 5—5, Figure 2, and looking in the direction of the arrows.

The auxiliary section 10 comprises two side plates 11 (Figs. 6 and 7). Each side plate 11 is provided with an upper inwardly extending flange 7a and a lower inwardly extending flange 8a. A lug 6a is formed on the upper flange 7a and on the inner end of side plate 11 is an ear 9a. On the inner face of side plate 11, and integral with flange 8a (Figs. 6 and 7) is a pivot lug 12. In assembling the apparatus, the ears 9 and 9a are placed together (Fig. 2) and a central shaft 13 extends through the apertures; this structure acts as a hinge to permit the excellent adjustment, as shown in Figures 3 and 4. A lower shaft 14 is journalled in bearings 15, which bearings are fastened to the top flange 7 of the two side plates 4. Fixedly secured on shaft 14 is a roller 16; shaft 14 also has fixedly secured thereon, near one end, a sprocket wheel 17. A central roller 18 is fixedly secured to shaft 13 and on one end of shaft 13 is fixedly secured a sprocket wheel 19; the sprocket wheels 17 and 19 are in alignment and a sprocket chain 20 is placed thereon. Under roller 16 is a rest block 21, which receives the roller when the apparatus is free of vehicle wheel 22, as shown in Fig. 1.

The auxiliary jaw 10 has the driven shaft 23 extending through the lug 6a and on one end of this shaft 23 is preferably a belt wheel 24. Contiguous to belt wheel 24 is also fixedly secured to said shaft a sprocket wheel 25. A second sprocket wheel 26 is fastened to shaft 13 and a sprocket chain 27 is mounted on said sprocket wheels 25 and 26. A pair of studs 28 are secured to platform 1 and a rod 29 extends through said studs. Two supporting links 30 are mounted at their lower ends upon rod 29 and their upper ends are suitably mounted on rod 31; this rod is journalled in lugs 6a of the side plates 11. In this manner, the auxiliary section 10 is admirably supported for pivotal movement to allow of the clamping or adjusting action of the apparatus against wheel 22.

A lever device 32 is provided for holding the apparatus in an adjusted position against the wheel (Fig. 3) and this lever device comprises a pair of links 33 that are pivotally connected at their upper ends to rod 34. The lower ends of links 33 are provided with a connecting rod 35. This rod 35 is adapted to be seated in one of several notches 36 of the rack 37, to hold the sections 3 and 10 in their adjusted position (Figs. 3 and 4).

A lifting and brake device 38 (Fig. 4) is provided, comprising body 39, which is furnished with an outwardly extending handle 40. The body 39 is mounted on rod 41. Rod 41 has its ends seated in lugs 12 (Figs. 6 and 7) of the side plates of the auxiliary section. On body 39 is a suitable shoe 42, and on its lower end is a suitable shoe 43. When it is desired to disengage rod 35 from the rack 37, the operator lifts up on handle 40, whereupon the lever device can be swung upwardly permitting the sections to pivot to their normal position as shown in Figure 1. The wheel 22 can be run off the device, without actuating same, while shoe 42 is pressing against roller 44, fastened to shaft 23. By pressing downwardly on handle 40, shoe 43 will engage the central roller 18, thereby braking same, against movement with respect to wheel 22, which will also cause the apparatus to be inoperative. It will, therefore, be seen that we have provided an excellent braking means acting on some of the rollers to prevent actuation of the mechanism while the wheel 22 is being retired off the apparatus, or if the operator prefers, while the wheel is being placed thereon.

Figure 10:
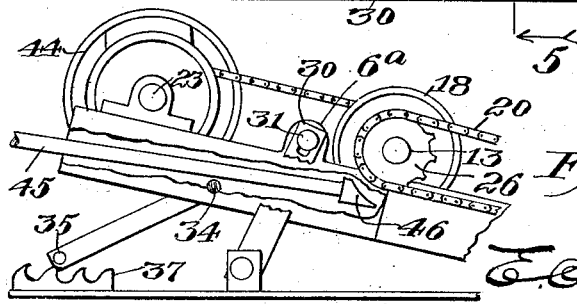
Figure 10 is a view in side elevation of another embodiment of the invention.

In the embodiment shown in Figure 10, the lever 45 is inserted inside the auxiliary jaw 10, and is provided with a block 46. By raising lever 45, it presses against the roller 44, and when the apparatus is in the position shown in Figures 3 and 4, by raising up on lever 45, pressure is also exerted against wheel 22, whereupon the connecting rod 35 is "unlashed" from the rack 37. When pressure is exerted upon lever 45 to cause it to move downwardly, block 46 approaches and bears against the central roller 18, holding the roller against rotation, to allow the wheel 22 to retire off the mechanism without actuating the same.

The shaft 23 is journalled in bearing 47 attached to the top flanges 7a of the side plates 11. The inwardly extending flanges on the side plates of both of the sections greatly strengthens the same, by increasing their rigidity.

A suitable runway 48 is provided on the platform 1 contiguous to the lower or approach end of the apparatus, whereby the wheel 22 of any motor vehicle can be easily and quickly placed upon the apparatus. Then the sections are efficiently moved and held to a nicety against the periphery of the tire, whereby excellent frictional contact is obtained for rotating the driven shaft 23, for transmitting power.

In Figures 11 to 13, we have shown another embodiment of our invention, in which two wheels 22 may be on the apparatus. In this embodiment, the double platforms 1a have upstanding portions 49, in which are journalled the shafts 50. The shafts 50 have rollers 51 fixedly secured thereto between the upstanding portions of said platform 1a. A rocking frame 52 is pivotally mounted upon each set of upstanding portions 49 and a single shaft 53 extends through the upper portion of rocking frames 52; fixedly secured within rocking frames 52, on shaft 53 are rollers 54. Belt wheels 55 are also fixedly secured to shaft 53 outside of said rocking frames. Sprocket wheels 56 are fixedly secured to shafts 50 and sprocket wheels 57 are fixedly secured to shaft 53. Sprocket chains 58 are mounted on sprocket wheels 56 and sprocket chains 59 are mounted on sprocket wheels carried by the inner shaft 50 and on sprocket wheels 57. The lever device 32 is used in this embodiment for adjusting the rocking frames and their rollers 54 with respect to, and holding them in contact with the vehicle wheels 22. In this embodiment, we have shown how our apparatus can be applied to two wheels of a vehicle by, generally speaking, increasing the length of the shafts carrying the wheel-engaging rollers. The base units of this embodiment constitute one section and the swinging frame unit constitutes another section, held by a lever device in working position with respect to vehicle wheels, similar in principle to the embodiment shown in Figures 1 to 4.

In the several embodiments of our invention, we have shown and described a folding section apparatus, which is admirably adapted to be utilized in securing power through a wheel, or wheels of a motor vehicle, whereby this power can be utilized to operate other machinery. We have disclosed herein admirable lever means for lifting portions of the apparatus and holding the same to a nicety against the vehicle wheel, and we have also shown brake means for preventing the apparatus from operating if the operator so desires, during the placement of the motor vehicle wheel on or off the apparatus.

While we have described the preferred embodiments of our invention and illustrated the same in the accompanying drawings, certain minor changes or alterations may appear to one skilled in the art to which this invention relates, during the extensive manufacture of the same, and we, therefore, reserve the right to make such changes or alterations as shall fairly fall within the scope of the appended claims.

What we claim is:

1. In an apparatus of the class described, the combination with a platform, of a primary and an auxiliary roller-carrying section supported upon said platform, rollers on said roller-carrying sections, a lifting and a braking device pivotally mounted upon said auxiliary section, said braking device comprising a rigid body provided with a shoe intermediate its length and with a shoe at its inner end, said shoes each adapted to engage and act as a brake upon a roller, and said body provided with a manually-engaged handle.

2. In an apparatus of the class described, the combination with a platform, of sections pivotally supported upon said platform, each section comprising side plates, each side plate provided with an inwardly extending flange, means supporting rollers upon said inwardly extending flanges, and means for retaining said sections in set positions with respect to a motor wheel.

3. In an apparatus of the class described, the combination with a platform, a pair of sections pivotally mounted on said platform, each section provided with ears, common fastening means extending through all of said ears hingedly connecting said sections together, rollers mounted on said sections, and means for adjusting and holding said sections in a set position upon said platform.

4. In an apparatus of the class described, the combination with a platform, of a pair of sections pivotally mounted independently upon said platform and hingedly connected at their contiguous ends, each section provided with a flanged upper edge, shaft-carrying lugs extending from said flanged upper edges, shafts above said sections and some of said shafts journalled in said shaft-carrying lugs, rollers fixedly secured to said shafts, means connecting said shafts, whereby when the rollers are rotated movement will be imparted to all of said shafts, means on one of said shafts for driving auxiliary machinery, and means for adjusting said sections to a nicety with respect to a motor wheel in engagement with said rollers.

5. In an apparatus of the class described, the combination with a platform, of a pair of roller-carrying hingedly-connected sections on said platform, rollers on said sections being adapted to support a wheel, one of said sections provided on its inner face with lugs, a rod journalled in said lugs, and a lifting and braking roller-engaging device mounted on said rod and adapted to operate on a wheel when supported by said rollers.

6. In an apparatus of the class described, the combination with a platform, of a primary and an auxiliary roller-carrying section hingedly connected and mounted upon said platform, rollers on said sections being adapted to support a wheel, said auxiliary section comprising a pair of side plates, each side plate provided with an inwardly extending bottom flange, an upstanding lug integral with the top of said flange and the inner face of said side plate, a rod between said side plates of the auxiliary section and journalled in said lugs, and a lifting and braking device in engagement with said rod and adapted to operate on a wheel when supported by said rollers.

In testimony whereof we hereunto affix our signatures.

ERNESTO LOBO, Sr.
ERNESTO LOBO, Jr.